March 19, 1940.　　　C. H. THUMA　　　2,194,037
AERATING DEVICE FOR LIQUIDS
Filed March 18, 1938　　　2 Sheets-Sheet 1

Inventor:
CHARLES H. THUMA
By M. Y. Charles
Attorney.

March 19, 1940.  C. H. THUMA  2,194,037
AERATING DEVICE FOR LIQUIDS
Filed March 18, 1938  2 Sheets—Sheet 2
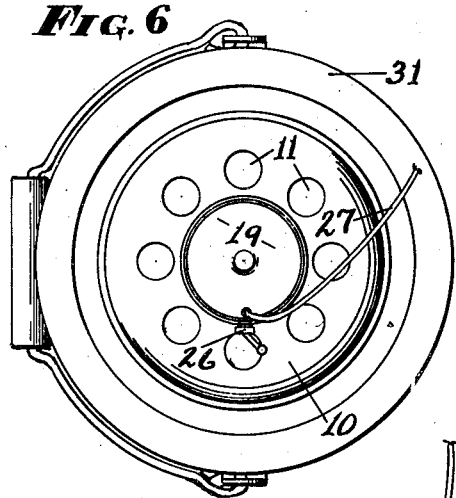
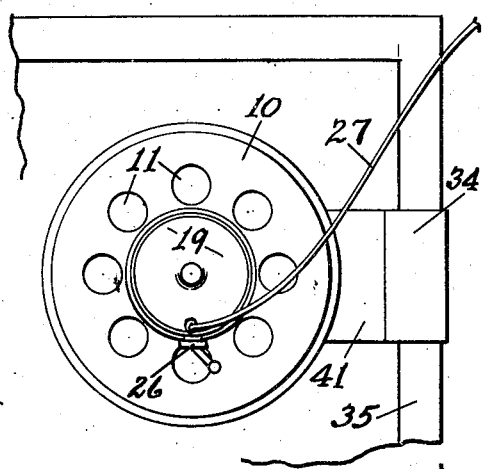
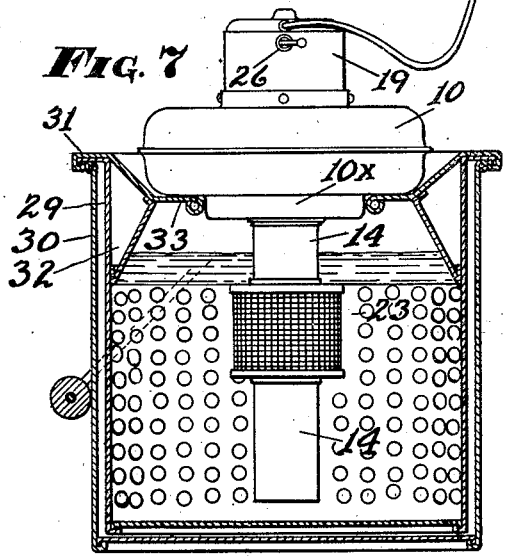
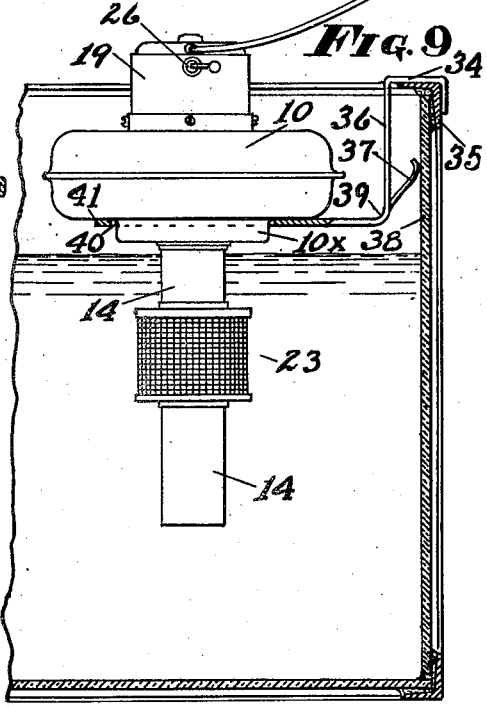
INVENTOR.
Charles H. Thuma
BY M. Y. Charles
ATTORNEY.

Patented Mar. 19, 1940

2,194,037

UNITED STATES PATENT OFFICE 2,194,037

AERATING DEVICE FOR LIQUIDS

Charles H. Thuma, Midian, Kans., assignor of one-half to Seth L. Way, Pratt, Kans.

Application March 18, 1938, Serial No. 196,750

4 Claims. (Cl. 261—91)

My invention relates to an improvement in water aerating and circulating devices.

The object of my invention is to provide a device which may be placed in or carried on containers whereby the liquid in the container may be taken from the upper portion of the liquid and sprayed into an atmosphere of air and returned to and discharged at the lower portion of the container, whereby a circulation of water may be set up and in the cycle of the circulation the water is aerated or brought in contact with the air so that the water will pick up a supply of oxygen from the air. This device is particularly useful in such places as aquariums, minnow buckets and the like.

Another object of using this device, is that the water is kept well supplied with oxygen, therefore large numbers of fish or minnows may be kept in a small volume of water due to the fact that the water is receiving a constant supply of oxygen to sustain the fish.

A further object is to provide a device of the kind mentioned which is simple and cheap to construct, and highly efficient in its work.

These and other objects will be more fully discussed as this description progresses.

Figure 1:
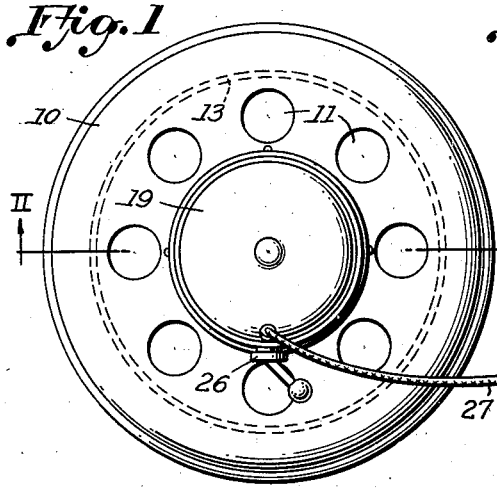
Figure 2:
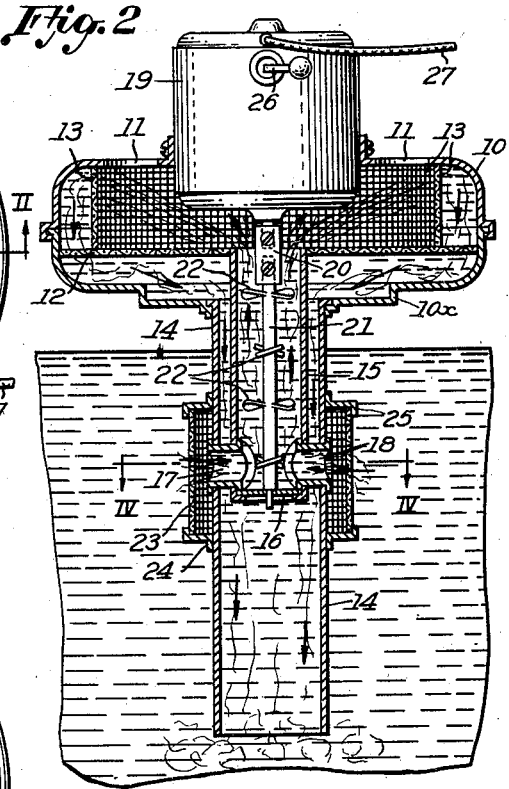
Figure 3:
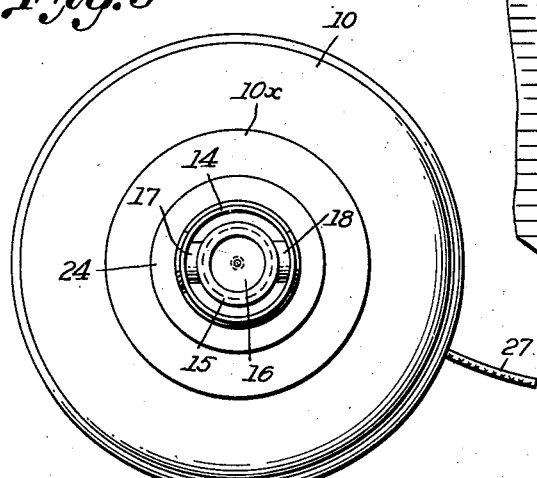
Figure 4:
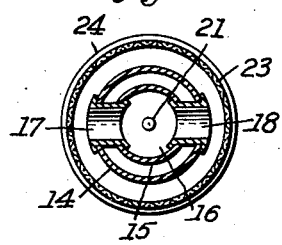
Figure 5:
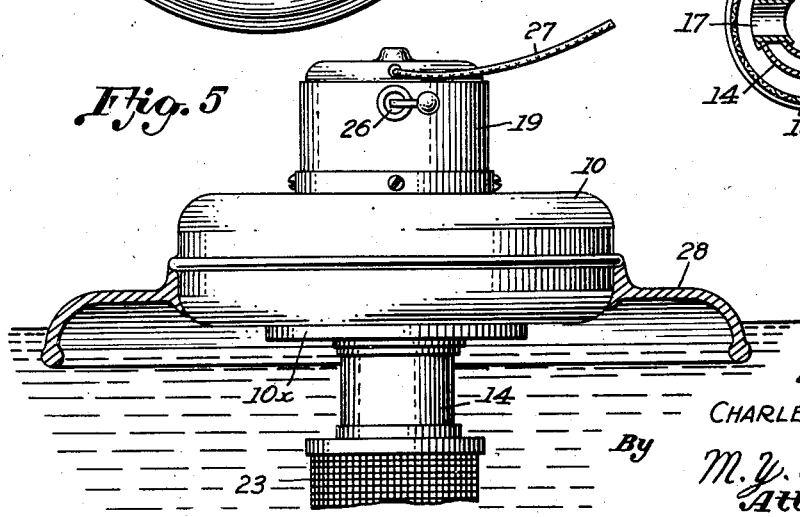

Now referring to the accompanying drawings. Fig. 1 is a plan view of the device. Fig. 2 is a sectional view as seen from the line II—II in Fig. 1. Fig. 3 is a bottom plan view of the device. Fig. 4 is a sectional view taken along the line IV—IV in Fig. 2. Fig. 5 is a side view of the upper portion of the device, illustrating an attachment whereby the device may be floated on the water, the attachment being shown in section. Fig. 6 is a plan view of the device as applied to a minnow bucket. Fig. 7 is a side view of the device, showing it applied to a minnow bucket, the minnow bucket being shown in section. Fig. 8 is a plan view of the device showing it as being used in a fish aquarium. Fig. 9 is a side view of the device shown in Fig. 8, and illustrating how the device may be carried on a bracket supported on the aquarium.

Similar numerals of reference designate the same parts throughout the several figures of the drawings.

In the drawings is shown the device which comprises a circular housing 10, having holes 11 in the top thereof for the admission of air into said housing. The housing is provided with a horizontally positioned screen element 12 which is spaced away from the lower portion or bottom of the housing 10.

At 13 is a circular shaped screen element, positioned within the housing 10 and extends between the screen 12 and the upper portion of the housing and is positioned intermediate the openings 11 and the side wall of the housing 10. The lower portion of the housing 10 is provided with a depressed portion 10x, the object of which will be later explained.

At 14 is a tubular element depending from the portion 10x of the housing and positioned concentric to the housing 10 and extends for a considerable distance below the housing 10, to a point where it is desired to discharge aerated water into the container in which the device is being used.

At 15 is a second tubular element which is smaller in diameter than the tubular element 14 and is positioned within the tubular element 14 and concentric therewith. The upper end of the tubular element 15 extends upwardly and passes through the screen element 12, the upper end of the tubular element 15 being left open. The lower portion of the tubular element 15 extends downwardly into the tubular element 14 for a short distance, the lower end of the tubular element 15 having a closure element 16.

At 17 and 18 are shown tubular elements passing through the side walls of the tubular elements 14 and 15 and function as a passage for the delivery of liquid (water) into the tube 15.

At 19 is shown a motor. This motor is preferably an electric motor, although it will be understood that other types of motors, such as spring motors may be employed.

The motor is carried by the housing 10 and is positioned on the vertical center axis of the housing 10 and tubular elements 14 and 15.

At 20 is shown a coupling element, one end of which is rigidly mounted on the drive shaft of the motor 19 and in the other end of the coupling 20 is rigidly mounted, one end of a shaft 21, the other end of the shaft 21 is carried in a bearing formed in the closure plate 16 at the lower end of the tubular element 15.

On the shaft 21 is a series of propeller-like elements, so positioned that as the motor runs, the shaft 21 and propellers 22 will be revolved in the tubular element 15 so as to lift any liquid in the tubular element 15 and discharge it therefrom at the top thereof.

At 23 is shown a screen element positioned around the tubular element 14 and spaced away therefrom and carried in circular support elements 24 and 25 which are rigidly attached to the tubular element 14 at points above and below the tubular elements 17 and 18 so that any liquid entering the tubular element 15 must pass through the screen 23.

The motor 19 is provided with a switch 26 by which the motor may be controlled. At 27 is shown an electric cord which is employed to feed an electric current to the motor 19 from any suitable source of supply such as from a battery, a transformer, or direct feed from a power line.

In Fig. 5 is shown the aerating device as having an attachment 28 which is made preferably of rubber and will fit with an air-tight joint against the vertical wall of the housing 10, and extends outwardly and downwardly therefrom and is circular in form. The object of this attachment is to provide a means of making the device cover a larger area so that the device may be floated on the water as will be readily understood and as illustrated in Fig. 5.

In Figs. 6 and 7 is shown a device as applied to the usual style of minnow bucket which comprises a bucket 29, which is positioned within another bucket 30, the bucket 29 having a flange 31 thereon that overlaps the edge of the bucket 30 so as to form a support for the bucket 29. The bucket 29 is provided with an annular air chamber 32, the walls of which are integral with a cover element 33 which is provided with the usual circular opening in the center thereof for entrance into the minnow bucket. The side walls of the bucket 29, below the air chamber 32 being perforated so as to allow the free passage of water therethrough, so that the bucket 29 may be removed from the bucket 30 and placed in the water of a stream or lake and the air chamber 32 would cause the bucket 29 to float and fresh water would continually flow through the bucket to sustain the minnows therein.

The portion 10x of the housing 10 is designed so as to fit within the opening in the top of the minnow bucket and functions as a means of holding the aerating device on the center axis of the minnow bucket, so as to insure even intake and distribution of water from and into the minnow bucket.

In Figs. 8 and 9 is illustrated the device as being used in a fish aquarium in which the device is supported on a bracket carried on the aquarium.

The bracket as shown comprises a single piece of sheet metal material having a hook formation 34 that will hook over the angle iron frame 35 of the aquarium and having a downwardly extending leg element 36 from which is punched a lip element 37 that rests against the glass 38 as a means of supporting the leg 36 in a vertical position.

The leg 36 is bent at the point 39 so as to form a horizontally extending plate 41 having a circular opening 40 therein in which is positioned the portion 10x of the housing 10 and the lower portion of the housing 10 is supported on the horizontal plate 41.

Thus the device is supported so that the tubular element 14 and screen element 23 are positioned below the surface of the water so that the water may be circulated as will later be described.

The operation of the device is as follows: The device is so positioned that the screen 23 and tubular element 14 are submerged in the water, whereupon the water will rise to the normal water line in the tubes 14 and 15, the water entering the tube 15 through the screen 23 and tubes 17 and 18. This being done, the switch 26 is thrown to start the motor whereupon the shaft and propeller blades 22 are revolved with comparatively high speed, the result of which is that the water in the tube 15 is set in a whirling motion within the tube 15 and is elevated therein and is discharged therefrom at the top of the tube 15, the result of which, due to the whirling motion of the water, centrifugal force will take effect and the water will be thrown in a thin sheet against the vertically positioned circular screen 13, and as the water is being thrown to the screen 13, air enters the housing 10, through the openings 11 to contact the flowing sheet of water, whereupon the water picks up oxygen from the air and the agitation set up by the flow of the water will cause a circulation of air in and out through the openings 11 so that fresh air is constantly being brought into contact with the flow of the sheet of water.

If the centrifugal force is not sufficient to throw all of the water through the screen 13 some water may drop and fall through the screen 12, however, all of the water thrown up in the housing 10 will drain to the bottom thereof and will flow by gravity downward through the pipe 14 and be discharged at the bottom thereof, which is adjacent the bottom of the container in which the water is held, therefore the cycle of circulation and aeration is: water is taken from near the surface of the water and sprayed in the presence of air so as to pick up a supply of oxygen from the air and return to the original body of air at a point adjacent the bottom thereof, from where it will eventually rise and again be recirculated as just described.

Now having fully described my invention, I claim:

1. In a water circulating and aerating device, said device comprising a housing, and a tubular element depending therefrom and opening thereinto, said housing having air openings therein, said housing having screened compartment partitions therein, a second tubular element, said second tubular element being positioned within the first said tubular element, the upper end of the second tubular element opening into one of the compartments of said housing, the lower end of said second tubular element being closed and positioned intermediate the ends of the first tubular element, and passage elements positioned at the bottom of the second tubular element and connecting the interior of the second tube and the exterior of the first tube, a motor, said motor being positioned in axial alignment with said tubes, a shaft, one end of shaft being carried in a bearing at the bottom of the second tubular element, the upper end of said shaft being rigidly connected with the rotary drive shaft of said motor, said shaft having propeller blades thereon so positioned as to force a flow of liquid upwardly in the second said tubular element and disperse the water from the second said tubular element into said compartments, when said shaft and propeller blades are rotated so that said water will drain through and be discharged from the lower end of the first tubular element.

2. In a water circulating and aerating device as in claim 1, and screened means carried on the first tubular element, and covering said passage elements as a strainer for liquids entering said passage elements.

3. In a water circulating and aerating device as defined in claim 1; and means attachable to the said housing for increasing the buoyancy of the device.

4. In a water circulating and aerating device as defined in claim 1; and means attachable to said housing for supporting said housing above the surface of the liquid to be circulated.

CHARLES H. THUMA.